US011192595B2

United States Patent
Cao et al.

(10) Patent No.: US 11,192,595 B2
(45) Date of Patent: Dec. 7, 2021

(54) OVERMOLDED BRACKETS FOR COMPOSITE SHOCK TOWER

(71) Applicant: Faurecia Emissions Control Technologies, USA, LLC, Columbus, IN (US)

(72) Inventors: Yang Cao, Troy, MI (US); Pankaj Ghevarchand Bedmutha, Pune (IN); Louis Moreau-Gentien, Royal Oak, MI (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 57 days.

(21) Appl. No.: 15/865,302

(22) Filed: Jan. 9, 2018

(65) Prior Publication Data

US 2019/0210655 A1     Jul. 11, 2019

(51) Int. Cl.
*B62D 25/08* (2006.01)
*B29C 45/14* (2006.01)
(Continued)

(52) U.S. Cl.
CPC ...... *B62D 25/088* (2013.01); *B29C 45/14065* (2013.01); *B29C 69/02* (2013.01); *B62D 25/18* (2013.01); *B62D 29/004* (2013.01); *B62D 29/043* (2013.01); *B29C 45/14786* (2013.01); *B29C 51/12* (2013.01); *B29C 2045/14131* (2013.01); *B29L 2031/30* (2013.01); *B60Y 2410/123* (2013.01)

(58) Field of Classification Search
CPC ... B29C 45/14467; B29C 70/68; B29C 70/74; B29C 70/76; B62D 29/04; B62D 29/048; B62D 29/004; B62D 65/12; B62D 65/02

USPC ..................... 264/271.1, 275, 279
See application file for complete search history.

(56) References Cited

U.S. PATENT DOCUMENTS 2,730,772 A *   1/1956  Jones ................. B62D 29/04
                                                   52/272
3,875,661 A *   4/1975  Lidstrom .............. B60R 19/52
                                                   296/191

(Continued)

FOREIGN PATENT DOCUMENTS

DE    102011014849 A1    9/2012
FR       2967965 A1    6/2012

OTHER PUBLICATIONS

Great Britain Search Report for Application No. GB 1900233.6 completed 21, Jun. 2019.

*Primary Examiner* — Matthew J Daniels
*Assistant Examiner* — Andrew D Graham
(74) *Attorney, Agent, or Firm* — Carlson, Gaskey & Olds, P.C.

(57) ABSTRACT

A method of making a shock tower assembly includes forming a bracket from continuous fiber reinforced thermoplastic, where the bracket has a load bearing portion and an overmolded portion. The method further includes placing the bracket in an injection tool, injecting a polymer composite material into the injection tool to surround the and overmolded portion of the bracket, and removing a finished component from the injection tool, wherein the finished component comprises the load bearing portion of the bracket extending outwardly from the finished component and the overmolded portion of the bracket that is surrounded by the polymer composite material.

19 Claims, 3 Drawing Sheets

(51) Int. Cl.
  *B62D 29/04* (2006.01)
  *B62D 25/18* (2006.01)
  *B29C 69/02* (2006.01)
  *B62D 29/00* (2006.01)
  *B29L 31/30* (2006.01)
  *B29C 51/12* (2006.01)

(56) References Cited

U.S. PATENT DOCUMENTS

| | | | | |
|---|---|---|---|---|
| 5,217,800 | A * | 6/1993 | Pentecost | B29C 48/395 |
| | | | | 428/297.4 |
| 5,226,695 | A * | 7/1993 | Flint | B60R 19/24 |
| | | | | 296/191 |
| 5,358,302 | A * | 10/1994 | Schoen | B62D 29/04 |
| | | | | 296/191 |
| 5,358,779 | A * | 10/1994 | McGarry | B62D 29/04 |
| | | | | 296/191 |
| 6,174,482 | B1 * | 1/2001 | Reames | B29C 45/14434 |
| | | | | 264/240 |
| 6,202,778 | B1 * | 3/2001 | Mistry | B60R 19/00 |
| | | | | 180/69.1 |
| 6,305,733 | B1 * | 10/2001 | Rahmstorf | B62D 25/142 |
| | | | | 296/70 |
| 6,345,706 | B1 * | 2/2002 | Oliver | F16F 9/463 |
| | | | | 188/267.2 |
| 8,556,281 | B2 | 10/2013 | Lee et al. | |
| 8,974,224 | B2 * | 3/2015 | Stanley | B29C 45/64 |
| | | | | 264/271.1 |
| 9,371,094 | B1 * | 6/2016 | Ferauche | B62D 27/023 |
| 9,542,685 | B2 * | 1/2017 | Proud | G06K 19/07762 |
| 9,580,107 | B1 * | 2/2017 | Ranga | B62D 29/004 |
| 9,701,250 | B1 * | 7/2017 | Ranga | B60R 11/0223 |
| 2003/0020202 | A1 * | 1/2003 | Ueno | B29C 45/5675 |
| | | | | 264/163 |
| 2004/0028858 | A1 * | 2/2004 | Schnell | B29C 65/64 |
| | | | | 428/36.9 |
| 2005/0062308 | A1 * | 3/2005 | Pfister | B60R 19/24 |
| | | | | 296/29 |
| 2005/0150087 | A1 * | 7/2005 | Lydan | B29C 45/1676 |
| | | | | 24/297 |
| 2005/0241259 | A1 * | 11/2005 | Rijsbergen | B60R 13/04 |
| | | | | 52/716.1 |
| 2006/0061008 | A1 * | 3/2006 | Karner | B29C 45/0017 |
| | | | | 264/250 |
| 2006/0138038 | A1 * | 6/2006 | Proulx | B01D 29/111 |
| | | | | 210/321.86 |
| 2007/0124912 | A1 * | 6/2007 | De Traglia Amancio Filho | B23B 51/08 |
| | | | | 29/447 |
| 2007/0138835 | A1 * | 6/2007 | Kapadia | B62D 25/082 |
| | | | | 296/193.09 |
| 2007/0295453 | A1 * | 12/2007 | Koelman | B29C 66/54 |
| | | | | 156/331.8 |
| 2009/0202761 | A1 * | 8/2009 | Malek | B62D 29/001 |
| | | | | 428/35.7 |
| 2009/0252908 | A1 * | 10/2009 | Angenheister | B62D 25/145 |
| | | | | 428/35.8 |
| 2010/0028113 | A1 * | 2/2010 | Tohyama | B62D 65/10 |
| | | | | 414/495 |
| 2011/0111176 | A1 * | 5/2011 | Chiu | B32B 3/02 |
| | | | | 428/157 |
| 2011/0266785 | A1 * | 11/2011 | Mildner | B62D 21/11 |
| | | | | 280/785 |
| 2011/0290980 | A1 * | 12/2011 | Bradshaw | F16F 1/3849 |
| | | | | 248/674 |
| 2012/0027983 | A1 * | 2/2012 | Elia | B32B 5/022 |
| | | | | 428/74 |
| 2012/0028062 | A1 * | 2/2012 | Elia | B32B 1/00 |
| | | | | 428/474.7 |
| 2012/0040169 | A1 * | 2/2012 | Boursier | B32B 27/42 |
| | | | | 428/223 |
| 2012/0248821 | A1 * | 10/2012 | Schmied | B62D 29/048 |
| | | | | 296/191 |
| 2013/0056466 | A1 * | 3/2013 | York | B29C 45/0046 |
| | | | | 220/200 |
| 2013/0057018 | A1 * | 3/2013 | Reese | B29C 45/1418 |
| | | | | 296/146.6 |
| 2013/0136529 | A1 * | 5/2013 | Py | B62D 65/02 |
| | | | | 403/266 |
| 2013/0241108 | A1 * | 9/2013 | Zynda | B60N 2/686 |
| | | | | 264/279 |
| 2013/0309435 | A1 * | 11/2013 | Boursier | B29C 70/745 |
| | | | | 428/53 |
| 2013/0320742 | A1 * | 12/2013 | Murolo | B60N 2/68 |
| | | | | 297/452.18 |
| 2014/0159425 | A1 * | 6/2014 | Kim | B62D 25/06 |
| | | | | 296/191 |
| 2014/0252796 | A1 * | 9/2014 | Huber | B60J 5/0406 |
| | | | | 296/146.2 |
| 2014/0291894 | A1 * | 10/2014 | Kannengiesser | C08L 23/14 |
| | | | | 264/328.17 |
| 2015/0068352 | A1 * | 3/2015 | Heitz | B62D 1/16 |
| | | | | 74/492 |
| 2015/0093186 | A1 * | 4/2015 | Nabuurs | F16B 1/00 |
| | | | | 403/267 |
| 2015/0130224 | A1 * | 5/2015 | Donabedian | B62D 25/16 |
| | | | | 296/198 |
| 2016/0244103 | A1 | 8/2016 | Amemiya | |
| 2016/0304130 | A1 | 10/2016 | Shin et al. | |
| 2017/0100996 | A1 * | 4/2017 | Husek | B60J 1/004 |
| 2017/0144504 | A1 * | 5/2017 | Al-Dahhan | F16F 1/37 |
| 2017/0203798 | A1 * | 7/2017 | Bhosale | B60B 3/10 |
| 2017/0305476 | A1 * | 10/2017 | Kulkarni | B62D 25/145 |
| 2017/0313030 | A1 * | 11/2017 | Song | B32B 15/043 |
| 2017/0320278 | A1 * | 11/2017 | Meeks | B29C 43/18 |
| 2017/0370671 | A1 * | 12/2017 | Tucker | F41A 23/18 |
| 2018/0056871 | A1 * | 3/2018 | Karner | B60R 1/06 |
| 2018/0194277 | A1 * | 7/2018 | Lobo | B60R 13/005 |
| 2018/0244215 | A1 * | 8/2018 | Husek | B60J 10/15 |
| 2019/0106070 | A1 * | 4/2019 | Busuioc | B60K 11/04 |
| 2019/0161126 | A1 * | 5/2019 | Dettling | B60K 5/12 |
| 2019/0232578 | A1 * | 8/2019 | Kneveler | B29B 11/16 |

\* cited by examiner

OVERMOLDED BRACKETS FOR COMPOSITE SHOCK TOWER

TECHNICAL FIELD

The subject invention relates to a shock tower that includes at least one overmolded bracket that is made from a continuous fiber reinforced polymer composite (CFRP) material, for example.

BACKGROUND OF THE INVENTION

Vehicles utilize many different suspension systems and components to absorb vibrations from road load inputs to improve vehicle control and passenger comfort. One such suspension component is a shock tower that is used to facilitate mounting of a damping component between a vehicle fixed structure and a suspension component for a vehicle wheel. Traditionally, shock towers have been formed from stamped steel components that are welded together to form a final assembly. These steel shock towers are heavy, time consuming to assemble, and adversely affect fuel economy. Die cast aluminum and magnesium shock towers provide for weight savings over traditional steel shock towers; however, these solutions have a cost premium that is only suitable for certain applications.

SUMMARY OF THE INVENTION

In one exemplary embodiment, a method of making a shock tower assembly includes forming a bracket from continuous fiber reinforced thermoplastic, where the bracket has a load bearing portion an overmolded portion. The method further includes placing the bracket in an injection tool, injecting a polymer composite material into the injection tool to surround the overmolded portion of the bracket, and removing a finished component from the injection tool, wherein the finished component comprises the load bearing portion of the bracket extending outwardly from the finished component and the overmolded portion of the bracket that is surrounded by the polymer composite material.

In a further embodiment of the above, the method includes thermoforming the bracket from an organo sheet to a predetermined shape.

In a further embodiment of any of the above, the method includes providing at least one location feature in the injection tool, inserting the bracket into the location feature, and applying pressure to opposing sides of the bracket to hold the bracket in place.

In a further embodiment of any of the above, the method includes at least one attachment feature in the load bearing portion of the bracket and inserting the load bearing portion of the bracket into the location feature such that the attachment feature is protected from the polymer composite material during injection molding.

In another exemplary embodiment, a shock tower assembly includes a shock tower body composed of a polymer composite material, and at least one bracket composed of a continuous fiber reinforced thermoplastic, the bracket having a load bearing portion extending outwardly from the shock tower body and an overmolded portion that is attached to the shock tower body at an overmolding interface.

In a further embodiment of any of the above, at least one attachment feature is formed in the load bearing portion of the bracket, wherein the attachment feature is configured to be attached to load bearing component.

In a further embodiment of any of the above, the overmolded portion of the bracket includes a transversely extending lip or flange that is overmolded with the polymer composite material.

These and other features of the present invention can be best understood from the following specification and drawings, the following of which is a brief description.

DETAILED DESCRIPTION

Figure 1:
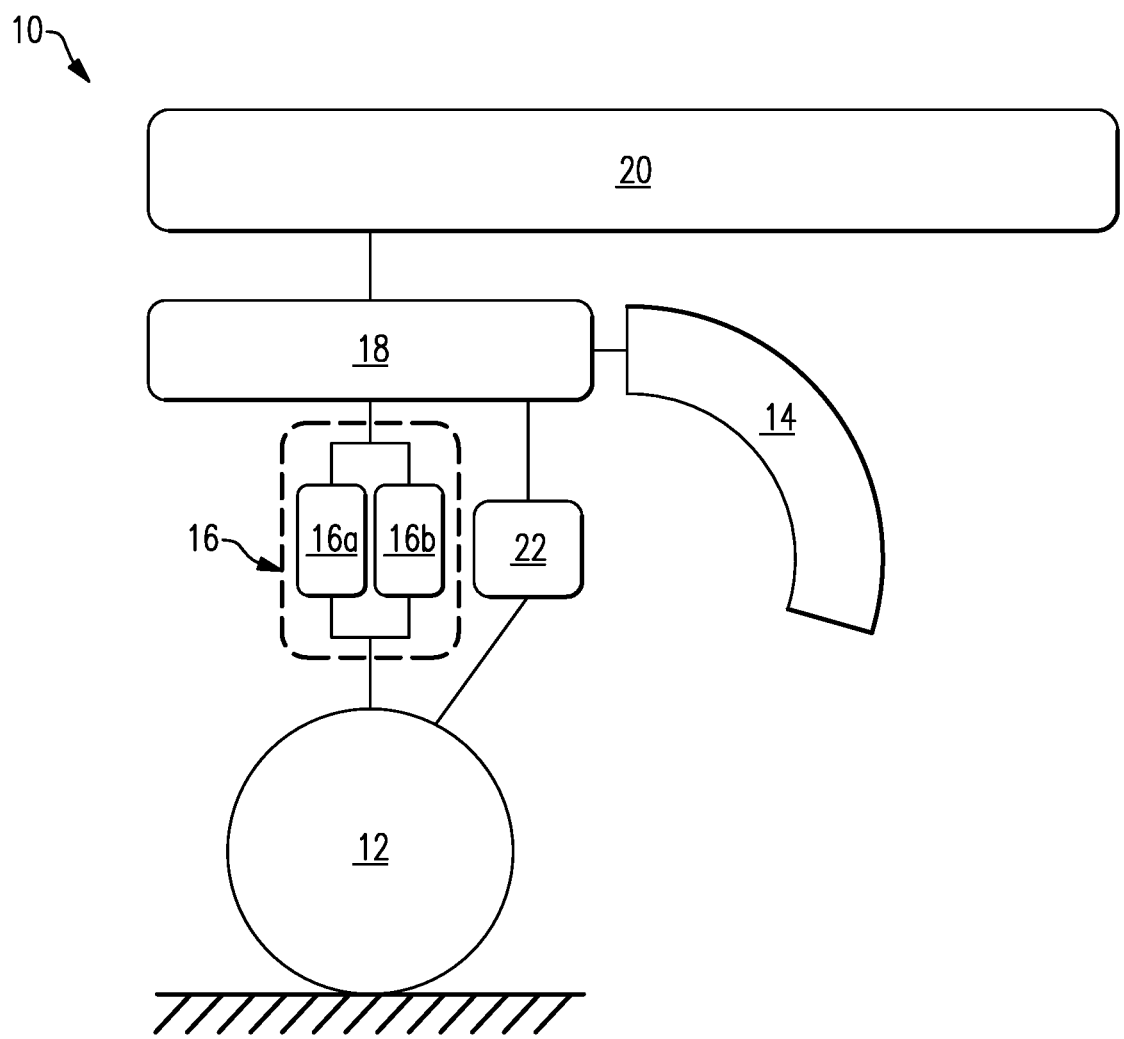
FIG. 1 is a schematic representation of a suspension assembly for a vehicle wheel.

FIG. 1 provides a schematic representation of a suspension assembly 10 for a vehicle wheel 12 that is positioned within a wheel cover 14. A strut 16, made of a spring 16a and a shock absorber 16b, is used to dampen road load inputs from the wheel 12 to facilitate vehicle control and improve passenger comfort. A shock tower 18 is used to facilitate mounting of the strut 16 to a fixed vehicle structure 20, such as a frame, chassis, body, etc. The shock tower 18 is also used to facilitate connection of the strut 16 to a suspension control arm 22 associated with the wheel 12. A wheel cover 14 is usually connected to strut 16 by mechanical fasteners or spot welding.

Figure 2A:
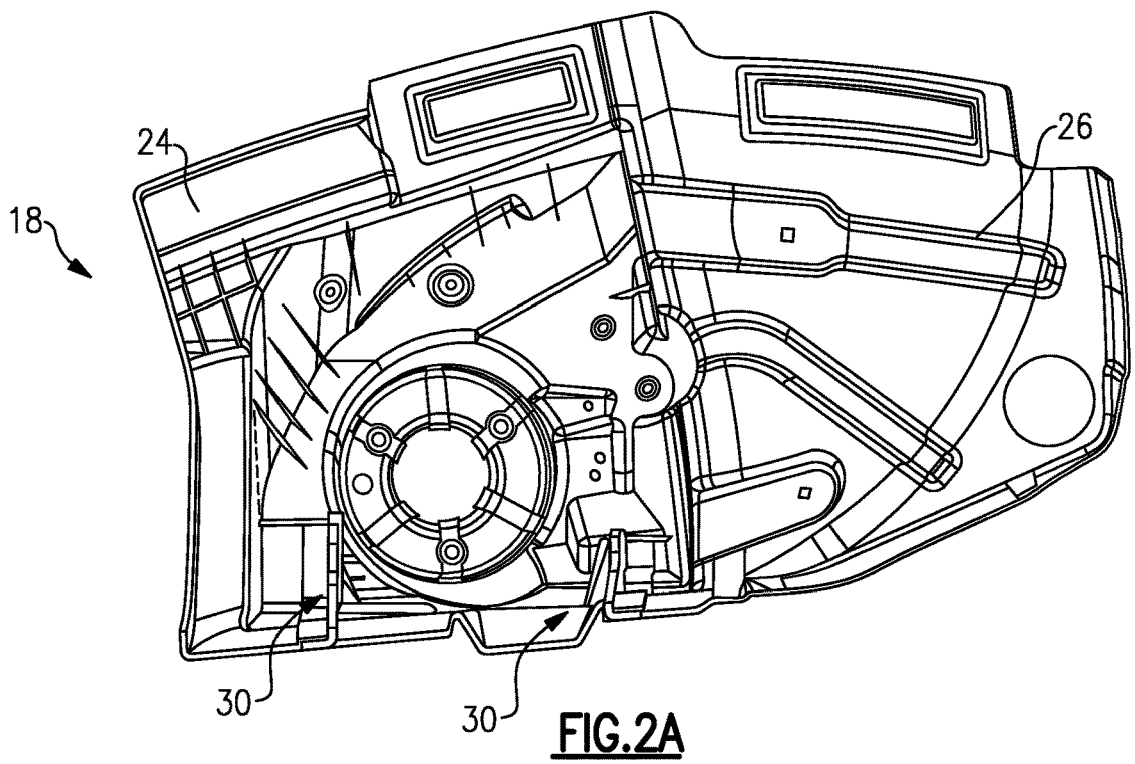
FIG. 2A is a perspective view of a composite shock tower and wheel cover integrally formed as a single piece component.
Figure 2B:
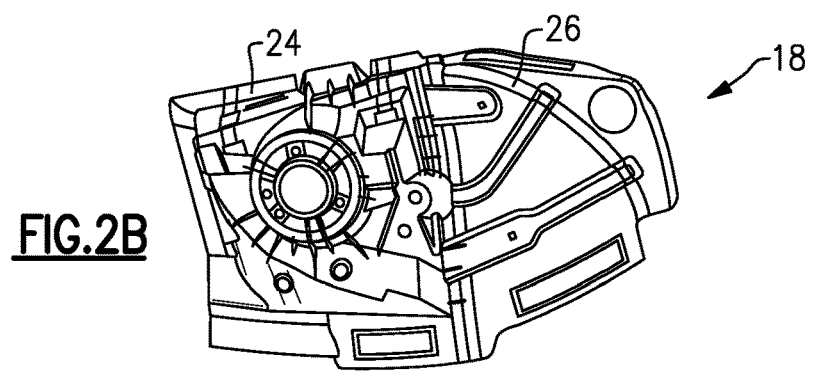
FIG. 2B is a top view of the composite shock tower and wheel cover of FIG. 2A.
Figure 2C:
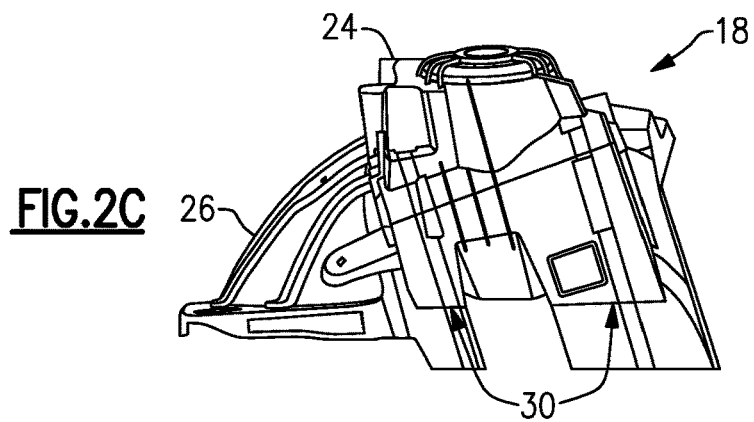
FIG. 2C is a side view of the composite shock tower and wheel cover of FIG. 2A.

As shown in FIGS. 2A-C, the shock tower 18 includes a shock tower body 24 and a wheel cover 26 that are integrally formed together as a single piece component. The shock tower 18 comprises an integrated polymer composite hybrid shock tower. Polymer materials in the form of injection molding resin and CFRP, for example, are used to reduce the overall weight of the shock tower 18.

As shown in FIGS. 2A-2D, shock tower body 24 and wheel cover 26 are both made of the same polymer composite material in a single process, which results in an integral, single piece component. In one example, an injection molding process is used to achieve the integration. Additional information regarding the shock tower 18 is found in co-pending application Ser. No. 15/865,307 which is assigned to the same Applicant as the subject application and which is hereby incorporated by reference.

In one example configuration, a load bearing bracket 30 (FIG. 3A) is overmolded as part of the shock tower 18. When replacing traditional die casted aluminum or magnesium shock towers with a polymer composite hybrid structure, some of the structural features cannot be reproduced through the use of direct injection of polymer composite material to form such structural features. For example, long load bearing brackets cannot be directly injection molded as part a shock tower due to issues such as injection length, risk of warping, draft angle, etc. The subject invention overmolds a bracket 30 formed from CFRP material as part of the shock tower. The use of CFRP enables the manufacture of long brackets inside an injected part which, as previously discussed, is not feasible by a traditional injection process. Further, the use of CFRP also has the advantage of providing the bracket 30 with higher load bearing capabilities.

Figure 3A:
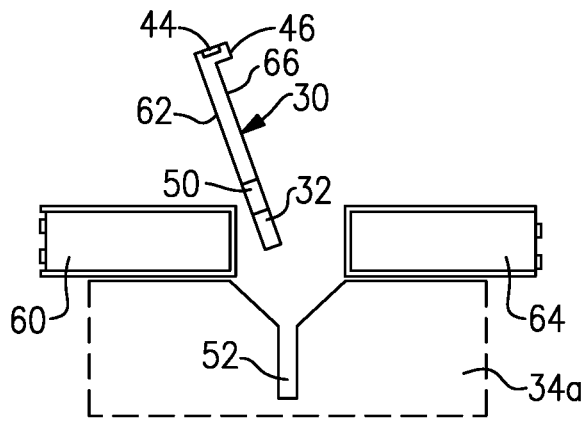
FIGS. 3A-D disclose method steps for making a component with an overmolded CFRP bracket.
Figure 3B:
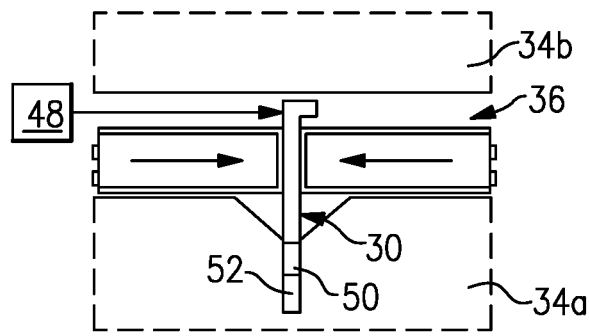
Figure 3C:
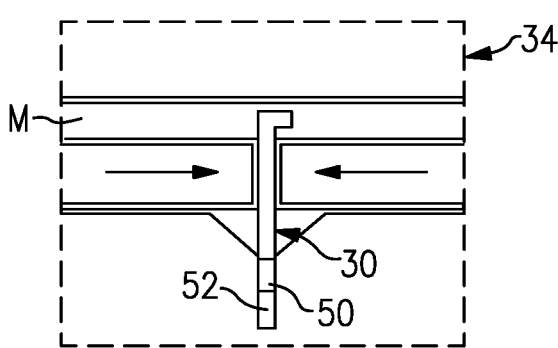
Figure 3D:
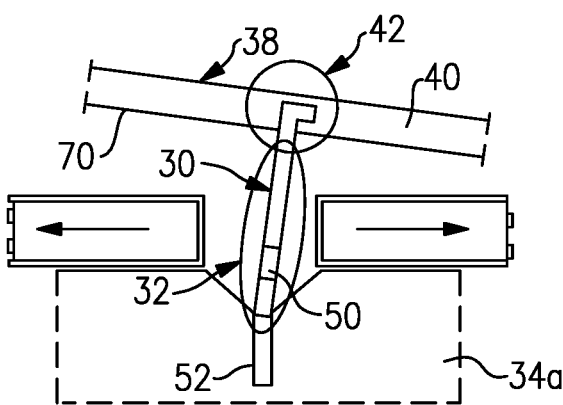

A method of making a component 38 with the bracket 30 is shown in FIGS. 3A-D. As shown in FIG. 3A, the bracket 30 is formed from CFRP and includes a load bearing portion 32. The bracket 30 is placed in an injection tool 34 that includes a bottom tool 34*a* and a top tool 34*b* that cooperate to enclose the bracket 30 within an internal cavity 36 (FIG. 3B). A polymer composite material M is injected into the injection tool 34 to surround one end of the bracket 30 as shown in FIG. 3C. The finished component 38 is removed from the injection tool 34 as shown in FIG. 3D. The finished component 38 comprises a component body 40 that is molded around an overmolded portion 42 of the bracket 30 at an overmolding interface. The load bearing portion 32 of the bracket 30 projects outwardly from the component body 40.

In one example, the bracket 30 is thermoformed from an organo sheet to a predetermined shape. Once in the required shape, the bracket 30 can then be trimmed and drilled/ machined to include one or more attachment features as needed. In one example, the attachment feature comprises at least one attachment hole 44 that facilitates mechanical bonding with the polymer composite material during injection. In another example, the attachment feature comprises at least one flange 46 formed at one end of the bracket 30 to facilitate mechanical bonding with the polymer composite material during injection. Other types of attachment features could also be incorporated in the bracket 30 to interface with the polymer composite material during injection to increase bonding of the bracket 30 to the component body 40.

In one example, the bracket 30 is heated to improve adhesion during injection. A heat source 48, such as an electric heater or heating element for example, can be used to heat the bracket 30 before being placed into the tool 34 or during the injection process.

In one example, at least one attachment feature 50 is formed in the load bearing portion 32 of the bracket 30. The attachment feature 50 can comprise a mounting hole with or without a metallic insert, flange, etc. that is configured for attachment to a load bearing component. In one example, the attachment feature 50 is machined into the bracket 30 prior to being inserted into the tool 34.

In one example, at least one location feature 52 is made in the injection tool 34. The bracket 30 is inserted into the location feature 52 and pressure is applied to opposing sides of the bracket 30 to hold the bracket in place during injection. The load bearing portion 32 of the bracket 30 is inserted into the location feature 52 such that the attachment feature 50 is protected from the polymer composite material during injection. In one example, the location feature 52 comprises a groove and the attachment feature 50 comprises at least one hole.

In one example, a first slide 60 is used to apply pressure against a first side 62 of the bracket 30 and a second slide 64 is used to apply pressure against a second side 66 of the bracket 30, opposite the first side 62, such that the bracket 30 is securely clamped between the first 60 and second 64 slides during injection of the polymer composite material. The slides 60, 64 also keep the bracket 30 in place during closing of the tool 34 (FIG. 3B). Further, the slides 60, 64 provide a sealing interface that prevents injected material from reaching the location feature 52 and the load bearing portion 32/attachment feature 50 of the bracket 30. The slides 60, 64 are then released to allow the finished component 38 to be removed from the tool 34 (FIG. 3D).

Figure 4:
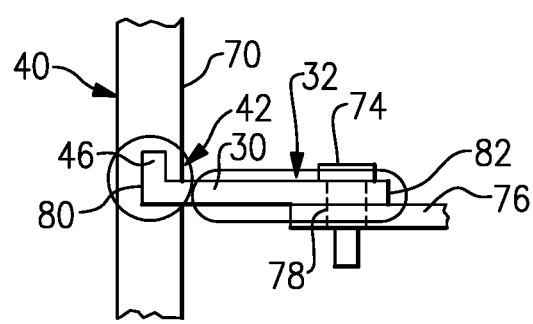
FIG. 4 is a schematic representation of a component made from the method shown in FIGS. 3A-D.

In one example, the component body 40 defines a planar surface 70 that surrounds the bracket 30 at the overmold interface 42. The load bearing portion 32 of the bracket 30 extends outwardly away from the planar surface 70 to a second end 82 that is configured for attachment via at least one fastener 74 to a load bearing component 76 (FIG. 4). In one example, the component body 40 is formed from the polymer composite material during the injection process.

FIG. 4 shows a schematic representation of the component body 40 composed of the polymer composite material and which includes at least one bracket 30 composed of the CFRP material. The load bearing portion 32 extends outwardly from the component body 40 and the bracket 30 is attached to the component body 40 at the overmolded portion 42 of the bracket 30. The load bearing component 76 includes at attachment feature 78, such as a hole for example, that aligns with the hole of the attachment feature 50 formed in the bracket 30 and at least one fastener 74 secures the components together.

The bracket 30 extends from a first end 80 to the second end 82 to define a bracket length that can vary per various design parameters The bracket has a thickness defined between the opposing sides 62, 66 that is limited by the CFRP thermoforming process.

In one example, the overmolded portion 42 includes a transversely extending lip or flange 46 with the first end 80 that is overmolded with the polymer composite material. This further increases the attachment strength of the bracket 30 to the component body 40. Optionally, metallic parts can be attached to the bracket 30 by riveting, fastening, etc., or during injection molding to further increase load bearing capabilities.

The subject invention provides a CFRP bracket 30 overmolded into a main component body structure, such as a shock tower structure for example, which results in significant weight and cost reduction when compared to traditional steel and aluminum component structures. The subject invention provides an out-of-plane bracket that supports loading of an integrated componeont body where the overmolded interface of the bracket is sufficiently strong to provide an attachment interface to other load bearing components. In addition to being used in shock towers, the subject invention could be applied to other parts made by injection or compression molding and that require brackets out of the main plane of the part with load bearing capabilities and without draft angle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of making a shock tower assembly comprising:
   (a) providing a suspension assembly for a vehicle wheel by forming a bracket from continuous fiber reinforced thermoplastic, the bracket having a load bearing portion and an overmolded portion;
   (b) placing the bracket in an injection tool;
   (c) injecting a polymer composite material into the injection tool to surround the overmolded portion of the bracket and protecting the load bearing portion from contact with the polymer composite material, and wherein step (b) includes completely enclosing the bracket within an internal cavity formed within the injection tool and step (c) includes sealing the load bearing portion within the internal cavity to prevent injected material from reaching the load bearing portion; and (d) removing a finished suspension component comprising a shock tower body from the injection tool, wherein the shock tower body mounts at least one second suspension component to a fixed vehicle structure and comprises the load bearing portion of the bracket extending outwardly from the shock tower body and the overmolded portion of the bracket that is surrounded by the polymer composite material.

2. The method according to claim 1 wherein step (a) includes thermoforming the bracket from an organo sheet to a predetermined shape.

3. The method according to claim 1 including trimming the bracket and forming at least one attachment feature at the overmolded portion of the bracket prior to step (b).

4. The method according to claim 3 wherein the attachment feature comprises at least one hole to facilitate mechanical bonding with the polymer composite material during injection molding.

5. The method according to claim 3 wherein the attachment feature comprises at least one flange to facilitate mechanical bonding with the polymer composite material during injection molding.

6. The method according to claim 1 including heating the bracket to provide a heated bracket during injection of the polymer composite material to improve adhesion during injection molding.

7. The method according to claim 1 including trimming the bracket and forming at least one attachment feature at the load bearing portion of the bracket prior to step (b).

8. A method of making a shock tower assembly comprising:
  (a) providing a suspension assembly for a vehicle wheel by forming a bracket from continuous fiber reinforced thermoplastic, the bracket having a load bearing portion and an overmolded portion;
  (b) placing the bracket in an injection tool, wherein the injection tool includes a bottom tool and a top tool that cooperate to provide an internal cavity, and including placing the bracket in the injection tool to completely enclose the bracket within the internal cavity;
  (c) injecting a polymer composite material into the injection tool to surround the overmolded portion of the bracket and protecting the load bearing portion from contact with the polymer composite material, and including providing at least one location feature in the injection tool, inserting the bracket into the location feature during step (b), and applying pressure to opposing sides of the bracket to hold the bracket in place during step (c); and
  (d) removing a finished suspension component comprising a shock tower body from the injection tool, wherein the shock tower body mounts at least one second suspension component to a fixed vehicle structure and comprises the load bearing portion of the bracket extending outwardly from the shock tower body and the overmolded portion of the bracket that is surrounded by the polymer composite material.

9. The method according to claim 8 including inserting the load bearing portion of the bracket into the location feature such that the attachment feature is protected from the polymer composite material during injection molding.

10. The method according to claim 8 wherein the location feature comprises a groove and wherein the attachment feature comprises at least one hole, and including inserting the load bearing portion of the bracket into the groove to position the bracket in the injection tool.

11. The method according to claim 8 including using at least a first slide to apply pressure against a first side of the bracket and a second slide to apply pressure against a second side of the bracket opposite the first side such that the bracket is securely clamped between the first and second slides during injection of the polymer composite material to prevent the bracket from moving and to isolate the load bearing portion of the bracket from polymer composite material.

12. The method according to claim 1 wherein the shock tower body defines a planar surface that surrounds the bracket, and wherein the load bearing portion of the bracket is free from the polymer composite material injected during step (c) and extends outwardly away from the planar surface to a distal end that is configured for attachment to a load bearing component.

13. The method according to claim 1 wherein the finished suspension component is formed from the polymer composite material.

14. The method according to claim 1 including forming the overmolded portion of the bracket to include a transversely extending lip or flange, and surrounding the transversely extending lip or flange with the polymer composite material during injection molding.

15. A method of making a shock tower assembly comprising:
  (a) providing a suspension assembly for a vehicle wheel by forming a bracket from continuous fiber reinforced thermoplastic, the bracket having a load bearing portion and an overmolded portion;
  (b) placing the bracket in an injection tool;
  (c) injecting a polymer composite material into the injection tool to surround the overmolded portion of the bracket and protecting the load bearing portion from contact with the polymer composite material, and including forming the bracket prior to inserting the bracket into the injection tool and subsequently heating the bracket prior to being placed into the injection tool or during step (c) to provide a heated bracket during injection of the polymer composite material to improve adhesion during injection molding; and
  (d) removing a finished suspension component comprising a shock tower body from the injection tool, wherein the shock tower body mounts at least one second suspension component to a fixed vehicle structure and comprises the load bearing portion of the bracket extending outwardly from the shock tower body and the overmolded portion of the bracket that is surrounded by the polymer composite material.

16. A method of making a shock tower assembly comprising:
  (a) providing a suspension assembly for a vehicle wheel by forming a bracket from continuous fiber reinforced thermoplastic, the bracket having a load bearing portion and an overmolded portion;
  (b) placing the bracket in an injection tool;
  (c) injecting a polymer composite material into the injection tool to surround the overmolded portion of the bracket and protecting the load bearing portion from contact with the polymer composite material; and
  (d) removing a finished suspension component comprising a shock tower body from the injection tool, wherein the shock tower body mounts at least one second suspension component to a fixed vehicle structure and comprises the load bearing portion of the bracket extending outwardly from the shock tower body and the overmolded portion of the bracket that is surrounded by the polymer composite material, and wherein the suspension assembly directly receives road load inputs from the vehicle wheel, and wherein the at least one second suspension component comprises a strut for the vehicle wheel that dampens road load inputs, the strut having a spring and a shock absorber, and including forming the shock tower body to include a strut mount interface that comprises at least one mounting hole that receives at least one fastening element to mount the strut to the fixed vehicle structure.

17. The method according to claim 1 wherein the suspension assembly directly receives road load inputs from the vehicle wheel, and wherein the at least one second suspension component comprises a suspension control arm that is associated with the vehicle wheel, and including forming the shock tower body to include a suspension control arm mount interface that comprises at least one mounting hole that receives at least one fastening element to mount the suspension control arm to the fixed vehicle structure.

18. The method according to claim 1 wherein the at least one second suspension component comprises a damper to dampen road load inputs from the vehicle wheel, and including forming the shock tower body to include a wheel cover that is positioned immediately adjacent to the vehicle wheel and damper.

19. The method according to claim 18 forming the wheel cover from the same polymer composite material as the shock tower body to form the shock tower body and wheel cover as an integral single-piece component that connects the at least one second suspension component to the fixed vehicle structure to dampen road load inputs while also at least partially covering the vehicle wheel.

* * * * *

UNITED STATES PATENT AND TRADEMARK OFFICE
CERTIFICATE OF CORRECTION

PATENT NO.      : 11,192,595 B2
APPLICATION NO. : 15/865302
DATED           : December 7, 2021
INVENTOR(S)     : Cao et al.

It is certified that error appears in the above-identified patent and that said Letters Patent is hereby corrected as shown below:

In the Claims

In Claim 9, Column 5, Line 63; replace "the attachment feature" with --an attachment feature--

In Claim 10, Column 5, Line 66-67; replace "the attachment feature" with --an attachment feature--

Signed and Sealed this
Seventeenth Day of May, 2022

Katherine Kelly Vidal
*Director of the United States Patent and Trademark Office*